United States Patent
Kim

(10) Patent No.: US 8,631,339 B2
(45) Date of Patent: Jan. 14, 2014

(54) MOBILE TERMINAL AND DISPLAYING DEVICE THEREOF WITH A PLURALITY OF TOUCH SCREENS AND VIRTUAL KEYPAD

(75) Inventor: Hyun-kook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 535 days.

(21) Appl. No.: 12/725,890

(22) Filed: Mar. 17, 2010

(65) Prior Publication Data

US 2011/0109567 A1    May 12, 2011

(30) Foreign Application Priority Data

Nov. 9, 2009   (KR) .......................... 10-2009-0107589

(51) Int. Cl.
*G06F 3/048* (2013.01)

(52) U.S. Cl.
USPC .............................. 715/773; 345/173; 345/1.3

(58) Field of Classification Search
USPC ................. 345/173–178, 1.1–1.3; 341/22–34; 340/407.1–407.2; 455/186.2; 715/764, 715/771–773, 252, 788–801
See application file for complete search history.

(56) References Cited

U.S. PATENT DOCUMENTS

| | | | |
|---|---|---|---|
| 2004/0130575 A1* | 7/2004 | Tai et al. ........................ | 345/773 |
| 2004/0150670 A1* | 8/2004 | Feldman et al. .............. | 345/781 |
| 2007/0011738 A1* | 1/2007 | Doss ............................... | 726/18 |
| 2007/0136677 A1* | 6/2007 | Agarwal ........................ | 715/767 |
| 2008/0119731 A1* | 5/2008 | Becerra et al. ................. | 600/437 |
| 2009/0158190 A1* | 6/2009 | Higginson ..................... | 715/773 |
| 2009/0167716 A1* | 7/2009 | Wang et al. .................... | 345/173 |
| 2010/0064244 A1* | 3/2010 | Kilpatrick et al. ............. | 715/773 |
| 2010/0262928 A1* | 10/2010 | Abbott .......................... | 715/769 |
| 2011/0175826 A1* | 7/2011 | Moore et al. .................. | 345/173 |

* cited by examiner

*Primary Examiner* — Liliana Cerullo
(74) *Attorney, Agent, or Firm* — Birch, Stewart, Kolasch & Birch, LLP

(57) ABSTRACT

A mobile terminal and a displaying method thereof are provided. The mobile terminal includes a first touch screen which displays a first object, a second touch screen which displays a second object, and a controller which controls display of a virtual keypad on the second touch screen when a touch input is applied to the first touch screen.

24 Claims, 24 Drawing Sheets

MOBILE TERMINAL AND DISPLAYING DEVICE THEREOF WITH A PLURALITY OF TOUCH SCREENS AND VIRTUAL KEYPAD

The present application claims priority from and the benefit of Korean Application No. 10-2009-0107589, filed on Nov. 9, 2009 which is hereby incorporated by reference.

BACKGROUND OF THE INVENTION

1. Field of the Invention

Embodiments of the invention relate to a mobile terminal and a displaying method thereof, and more particularly, to a mobile terminal and a displaying method thereof for displaying a keypad on a touch screen that does not initially receive a touch input among a plurality of touch screens to allow key input to be performed through the keypad without blocking a user's view of an object.

2. Discussion of the Related Art

An electronic device including a touch screen may provide both an information inputting function and an information displaying function through the touch screen, and thus a user can conveniently operate the electronic device. The electronic device including a touch screen may provide only a function with respect to a simple operation of the touch screen.

An electronic device including a plurality of logically or physically divided touch screens may provide functions for carrying out various operations of the plurality of touch screens. Accordingly, development of a variety of methods may be needed for controlling an electronic device using the plurality of touch screens.

SUMMARY OF THE INVENTION

The embodiments of the invention provides a mobile terminal and a displaying method thereof, and more particularly, a mobile terminal and a displaying method thereof for displaying a keypad on a touch screen that does not initially receive a touch input among a plurality of touch screens to allow key input to be performed through the keypad without blocking a user's view of an object.

According to an embodiment of the invention, a mobile terminal includes a first touch screen which displays a first object; a second touch screen which displays a second object; and a controller which controls display of a virtual keypad on the second touch screen when a touch input is applied to the first touch screen.

According to an embodiment of the invention, a mobile terminal includes a plurality of touch screens including at least one input window; and a controller which controls display of a virtual keypad on one of the plurality of touch screens, on which an input window for receiving a touch input is not displayed.

According to an embodiment of the invention, a displaying method of a mobile terminal includes receiving a touch input applied to one of first and second touch screens; and displaying a virtual keypad on the other of the first and second touch screens.

According to an embodiment of the invention, a mobile terminal includes a first touch screen, when activated by a touch input thereto, is enabled to receive input of characters; and a second touch screen, when the first touch screen is activated by the touch input, is caused to display a virtual keypad usable to input the characters for the first touch screen.

BRIEF DESCRIPTION OF THE DRAWINGS

Arrangements and embodiments are described in detail with reference to the following drawings in which like reference numerals refer to like elements and wherein.

DETAILED DESCRIPTION OF THE EMBODIMENTS

Embodiments of the invention may provide a plurality of touch screens for a mobile terminal and the mobile terminal perform various operations corresponding to touch inputs respectively applied to the plurality of touch screens. Various operations corresponding to touch inputs respectively applied to a plurality of touch screens may be performed, and thus a user can conveniently operate the mobile terminal.

Various types of a mobile terminal may include a cellular phone, a smart phone, a laptop computer, a digital broadcasting terminal, personal digital assistants (PDA), a portable multimedia player (PMP), a navigation system and/or so on. In the following description, suffixes "module" and "unit" may be given to components of the mobile terminal in consideration of only facilitation of description and do not have meanings or functions discriminated from each other.

Figure 1:
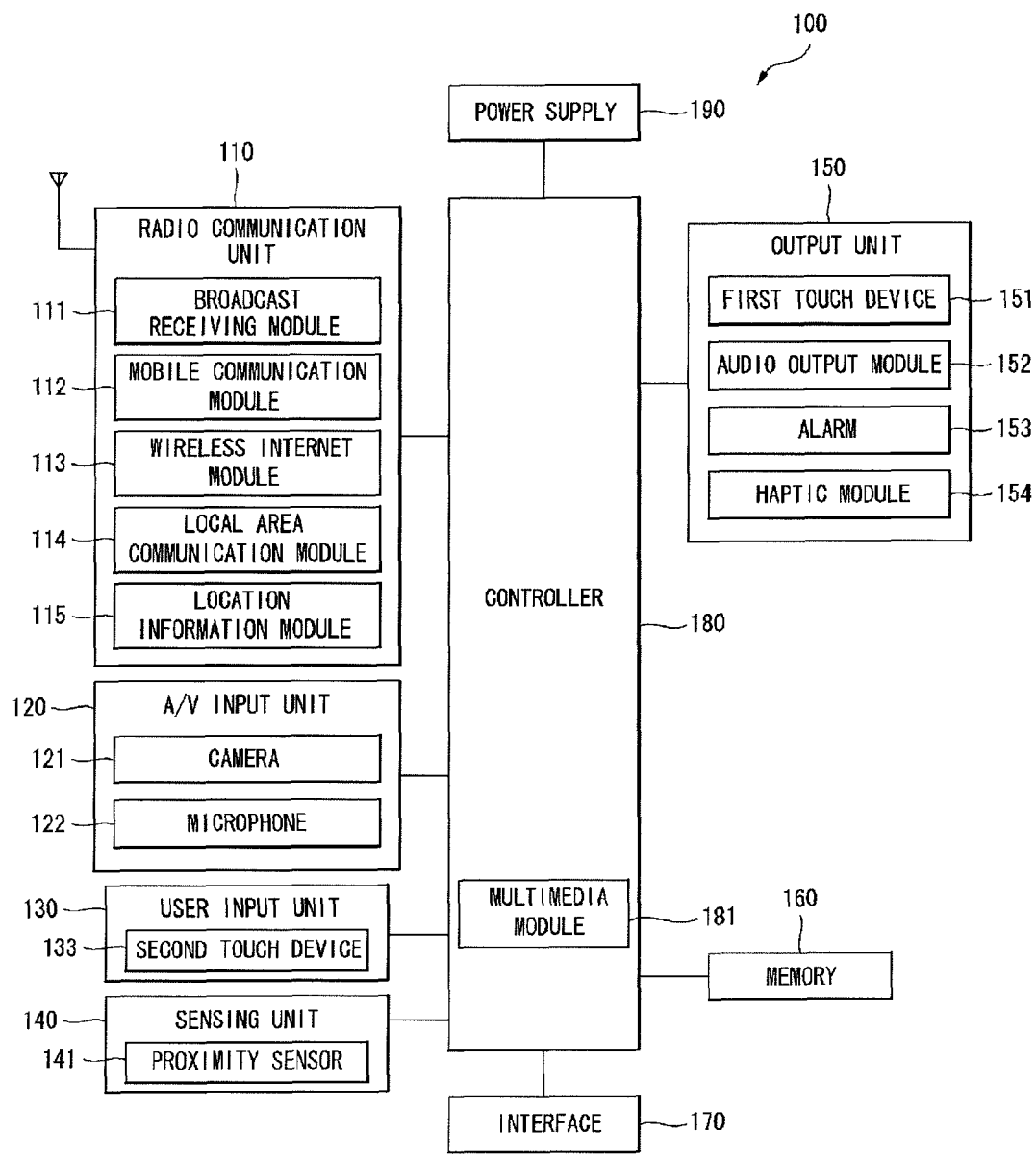
FIG. 1 is a block diagram of a mobile terminal according to an example embodiment.

FIG. 1 is a block diagram of a mobile terminal according to an example embodiment. Other embodiments, configurations and arrangements may also be provided. As shown, a mobile terminal 100 may include a radio communication unit 110, an audio/video (A/V) input unit 120, a user input unit 130, a sensing unit 140, an output unit 150, a memory 160, an interface 170, a controller 180 and a power supply 190.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcast receiving module 111, a mobile communication module 112, a wireless Internet module 113, a local area communication module 114 and a location information module 115 (or a position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information, or a server that receives previously created broadcasting signals and/or broadcasting related information and transmits the broadcasting signals and/or broadcasting related information to a terminal.

The broadcasting signals may include not only TV broadcasting signals, radio broadcasting signals and data broadcasting signals, but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of the digital multimedia broadcasting (DMB) system or in the form of an electronic service guide (ESG) of the digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems, etc. The broadcasting receiving module ill may also be constructed to broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. A wireless LAN (WLAN) (Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, bluetooth, radio frequency identification (RFID), infrared data association (IrDA), ultra wideband (UWB) and/or ZigBee may be used as a local area communication technique.

The location information module 115 may confirm or obtain the position of the mobile terminal. The position information module 115 may obtain position information by using a global navigation satellite system (GNSS). The GNSS is a terminology describing radio navigation satellite systems that orbit round the earth and transmit reference signals to predetermined types of radio navigation receivers such that the radio navigation receivers can determine their positions on the earth's surface or near the earth's surface. The GNSS may include a global positioning system (GPS) of the United States, Galileo of Europe, global orbiting navigational satellite system (GLONASS) of Russia, COMPASS of China, quasi-zenith satellite system (QZSS) of Japan and so on.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 (or a display unit).

The image frames processed by the camera 121 may be stored in the memory 160 or may be transmitted to an external device through the radio communication unit 110. The mobile terminal 100 may also include at least two cameras.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the terminal from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100 and acceleration/deceleration of the mobile terminal 100, and generate a sensing signal for controlling operation of the mobile terminal 100. For example, the sensing unit 140 may sense whether a slide phone is opened or closed when the mobile terminal 100 is the slide phone. Further, the sensing unit 140 may sense whether the power supply 190 supplies power and/or whether the interface 170 is connected to an external device. The sensing unit 140 may also include a proximity sensor 151.

The output unit 150 may generate visual, auditory and/or tactile output and may include the display 151, an audio output module 152, an alarm 153 and a haptic module 154.

The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmission type. That is, the display 151 may include a transparent display.

The transparent display may include a transparent liquid crystal display. The rear structure of the display 151 may also be of a light transmission type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays that are arranged on a single face at a predetermined distance or integrated displays. The plurality of displays may also be arranged on different sides.

In addition, when the display 151 and a sensor to sense touch (hereafter referred to as a touch sensor) form a layered structure that is referred to as a touch screen, the display 151 may be used as an input device in addition to an output device. The touch sensor may be in the form of a touch film, a touch sheet and a touch pad, for example.

The touch sensor may convert a variation in pressure applied to a specific portion of the display 151 or a variation in capacitance generated at a specific portion of the display 151 into an electric input signal. The touch sensor may sense pressure of a touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical or physical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. A capacitive touch screen may be constructed such that proximity of a pointer is detected through a variation in an electric field according to the proximity of the pointer. The touch screen (touch sensor) may be classified as a proximity sensor.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen to which the pointer touches the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions (e.g., a call signal incoming tone, a message incoming tone, etc.) performed in the mobile terminal 100. The audio output module 152 may include a receiver, a speaker, a buzzer, etc. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, inputting touch, etc. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may also not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data (e.g., phone book, messages, still images, moving images, etc.). The memory 160 may also store data about vibrations and sounds in various patterns that are output from when a touch input is applied to the touch screen.

The memory 160 may include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. The interface 170 may include a wired/wireless headset port, an external charger port, a wired/wireless data port, a memory card port, a port for connecting a device having a user identification module, an audio I/O port, a video I/O port, an earphone port, etc., for example.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the invention may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

FIGS. 2A, 2B, 3A, 3B, 4A and 4B illustrate an external appearance of the mobile terminal 100 according to example embodiments. The mobile terminal 100 may include a first body 101 and a second body 102 that are combined (or connected) with each other through a combining part 195 (or a connecting part). The combining part 195 may be a hinge. As appreciated, the combining part may be a swivel. Alternatively, the first body 101 and the second body 102 may be slidable relative to each other.

The first body 101 and the second body 102 may be combined or connected with each other in various manners. For example, the combining part 195 may combine the first body 101 and the second body 102 with each other in such a manner that the mobile terminal 100 folds the first body 101 relative to the second body 102. Further, the combining part 195 may combine or connect the first body 101 and the second body 102 such that the first body 101 and the second body 102 can slide in opposite directions relative to each other. While the first body 101 and the second body 102 are combined by the combining part 195 in such a manner that the mobile terminal 100 may fold the first body 101 relative to the second body 102, example embodiments are not limited thereto.

Figure 2A:
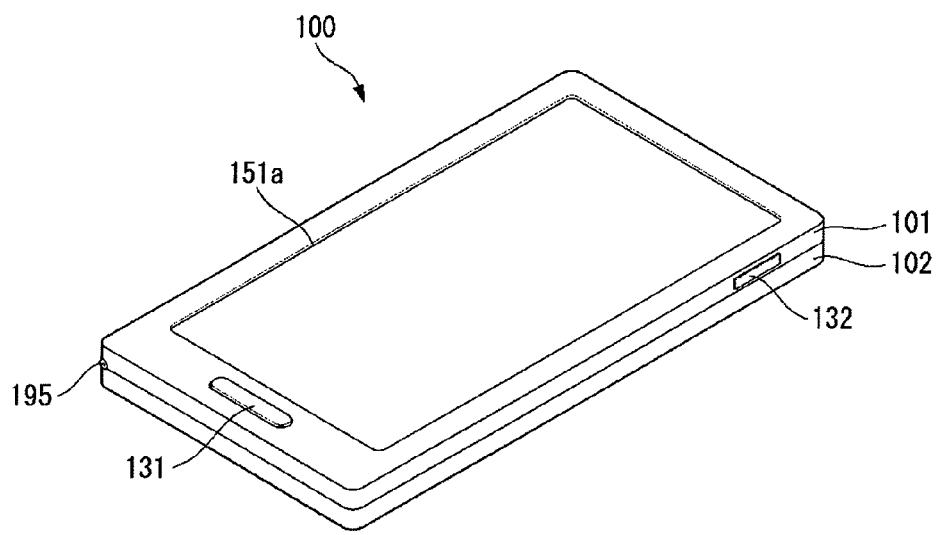
FIGS. 2A, 2B, 3A, 3B, 4A and 4B illustrate an external appearance of the mobile terminal according to example embodiments.
Figure 2B:
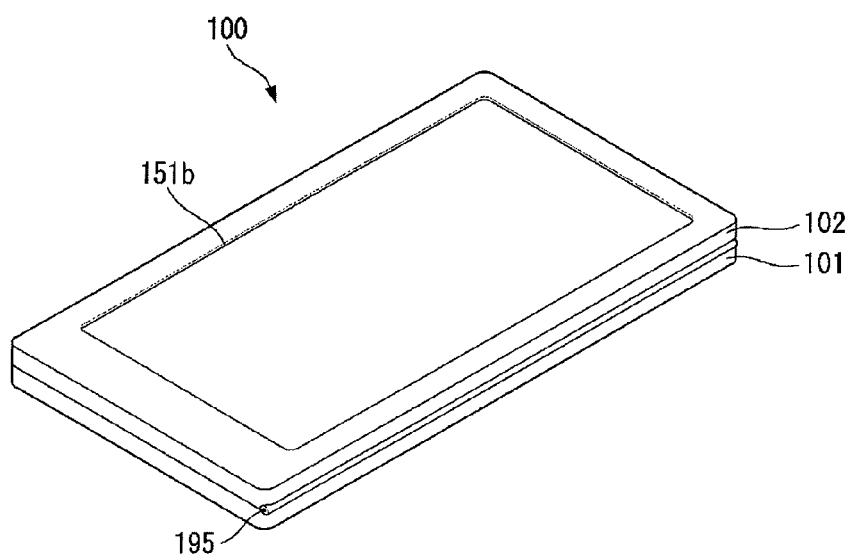
Figure 3A:
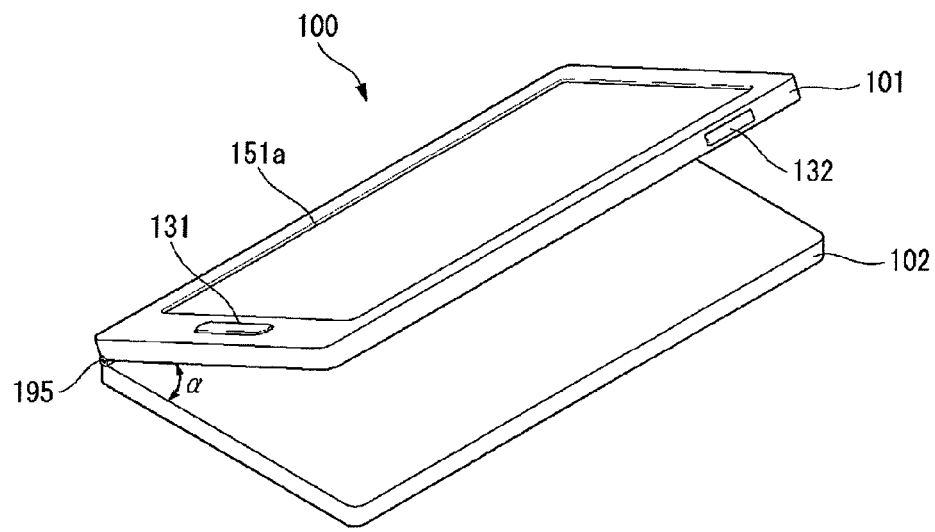
Figure 3B:
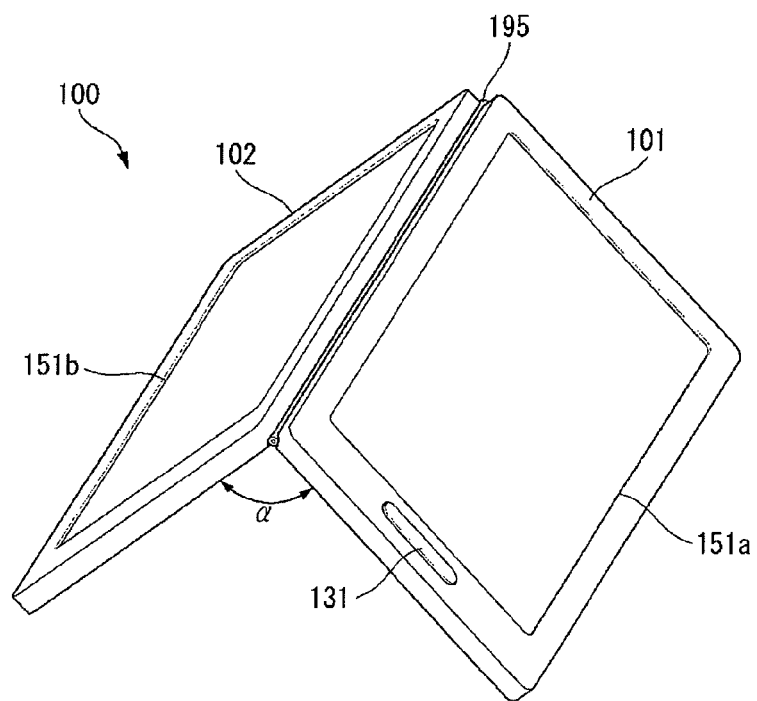
Figure 4A:
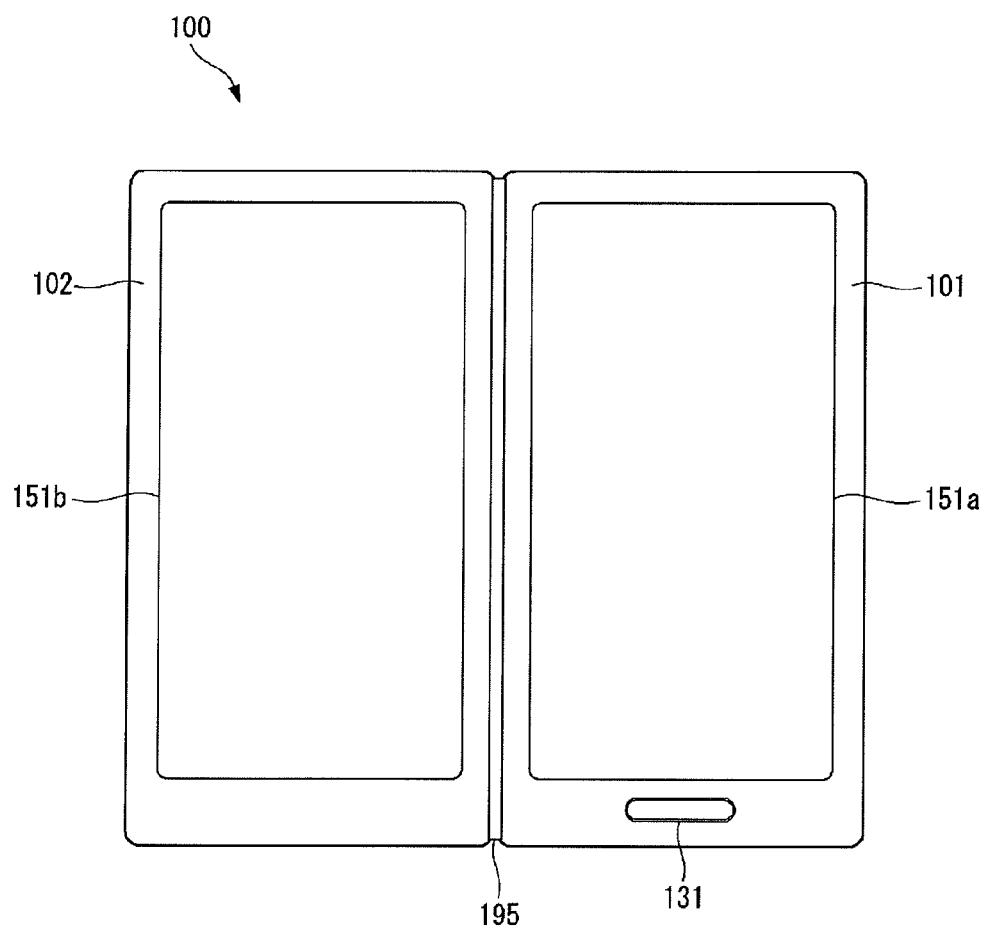
Figure 4B:
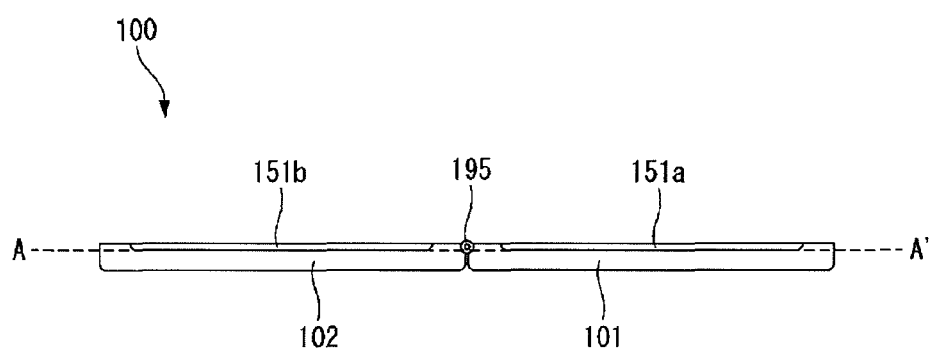

FIGS. 2A and 2B are perspective views showing the first body 101 and the second body 102 in a closed status. FIGS. 3A and 3B are perspective views showing the first body 101 and the second body 102 in a half open status. FIGS. 4A and 4B are respectively a front view and a side view showing the first body 101 and the second body 102 in a fully open status. The user can open and close the first body 101 and the second body 101, as shown in FIGS. 2A, 2B, 3A, 3B, 4A and 4B.

The first body 101 may include a first touch screen 151a and the second body 102 may include a second touch screen 151b. The first and second touch screens 151a and 151b may perform both an information inputting function and an information displaying function. The information inputting function may be implemented in a touching manner.

One side of the first body 101 to which the first touch screen 151a is provided and one side of the second body 102 to which the second touch screen 151b is provided may not come into contact with each other when the first and second bodies 101 and 102 are in the closed status. As shown in FIG. 2, the first and second touch screens 151a and 151b may not come into contact with each other when the first and second bodies 101 and 102 are in the closed status. In this embodiment, the screens 151a and 151b face in opposite directions in a closed state. In another embodiment, the screens 151a and 151b may face each other in a closed state.

One side of the first body 101 to which the first touch screen 151a is provided and one side of the second body 102 to which the second touch screen 151b is provided may be located in a substantially same plane when the first and second bodies 101 and 102 are in the fully open status. As shown in FIG. 4B, the first and second touch screens 151a and may be arranged in a substantially same plane when the first and second bodies 101 and 102 are in the fully open status.

The folding of the mobile terminal 100 using the first body 101 and the second body 102 is not limited to the example shown in FIGS. 4A and 4B. For example, an angle α between the first and second bodies 101 and 102 may be in a range of 0° to 180°, as shown in FIGS. 2, 3, 4A and 4B. The first and second bodies 101 and 102 may be combined by the combining part 195 such that the angle α between the first and second bodies 101 and 102 becomes greater than 180°, but less than 360° such that they do not contact one another.

The controller 180 may sense the open/closed status of the first and second bodies 101 and 102 and the angle α between the first and second bodies 101 and 102 based on the sensing unit 140. The controller 180 may sense the direction of the first touch screen 151a and/or the second touch screen 151b based on the sensing unit 140. As shown in FIG. 4A, the mobile terminal 100 may be provided on a desk such that the first and second touch screens 151a and 151b face the ground or face opposite directions when the angle α between the first and second bodies 101 and 102 is 180°. The controller 180 may sense a position or a direction of the mobile terminal 100.

The sensing unit 140 may include at least one of a hall sensor, a 3-axis or a 6-axis motion sensor, a terrestrial magnetic sensor and/or an acceleration sensor in order to sense the position or the direction of the mobile terminal 100.

The mobile terminal 100 may include at least one of a first operating part 131 and a second operating part 132, as shown in FIGS. 2, 3, 4A and 4B. The first and second operating parts 131 and 132 may be operating units as part of the user input unit 130 and correspond to the aforementioned key pad.

The mobile terminal 100 may receive a command for controlling operation of the mobile terminal 100 through at least one of the first and second operating parts 131 and 132. Commands input through the first and second operating parts 131 and 132 may be set in various manners. For example, commands such as start, finish and scroll may be input through the first operating part 131 and a command for adjusting a volume of sound output from the audio output unit 152 and a command for converting the display 151 into the touch recognition mode may be input through the second operating part 132.

Figure 5:
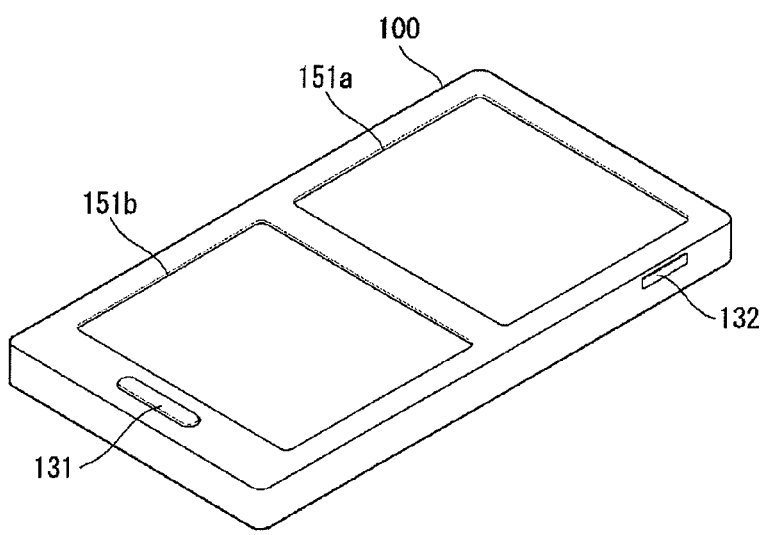
FIG. 5 illustrates a mobile terminal according to another embodiment.

The structure of the mobile terminal 100 is not limited to the examples shown in FIGS. 2, 3, 4A and 4B. FIG. 5 illustrates the mobile terminal 100 in a different structure. As shown in FIG. 5, the mobile terminal 100 may include the first and second touch screens 151a and 151b on a single body.

Figure 6:
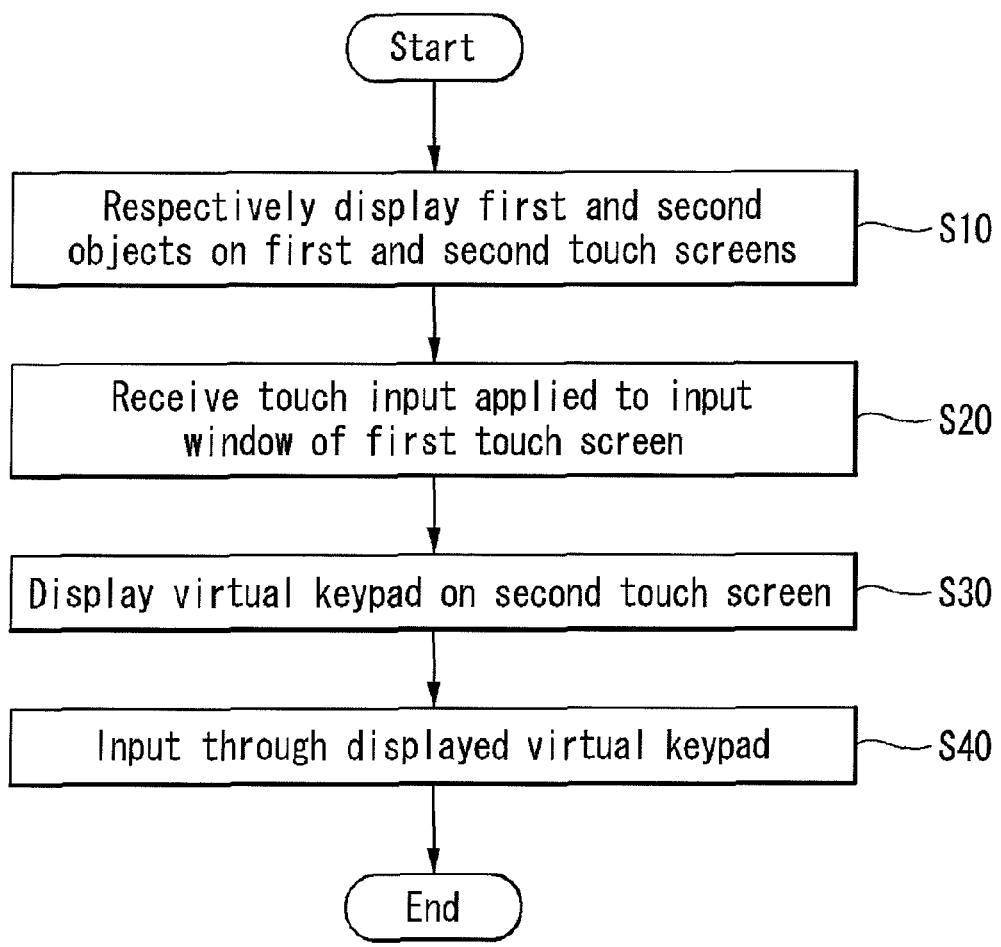
FIG. 6 is a flowchart showing an operation of mobile terminal according to a first embodiment.
Figure 7:
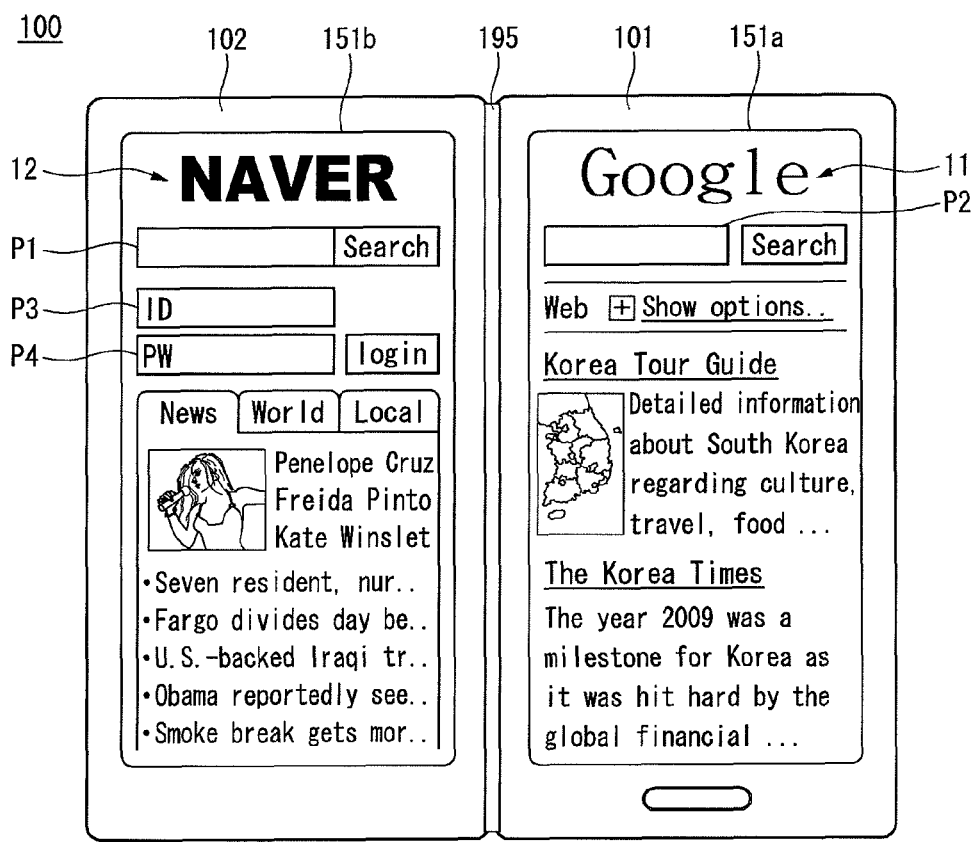
FIG. 7 illustrates touch screens of the mobile terminal according to the first embodiment.

FIG. 6 is a flowchart showing an operation of the mobile terminal 100 according to a first example embodiment and FIG. 7 illustrates touch screens of the mobile terminal 100 shown in FIG. 6.

As shown in FIGS. 6 and 7, the mobile terminal 100 may respectively display first and second objects 11 and 12 on the first and second touch screens 151a and 151b in operation S10.

As described above, the first and second bodies 101 and 102 respectively including the first and second touch screens 151a and 151b are combined with each other by the combining part 195 such that the first and second bodies 101 and 102 can be folded and unfolded. The first and second touch screens 151a and 151b may be displays respectively included in the first and second bodies 101 and 102. The first and second touch screens 151a and 151b may receive a touch input from the user through touch sensors respectively included therein. When the user applies a touch input to the first and second touch screens 151a and 151b, a touch signal corresponding to the touch input can be transmitted to the controller 180 (shown in FIG. 1) to perform an operation corresponding to the touch input. While the first and second touch screens 151a and 151b are shown as physically divided two displays in FIG. 7, the first and second touch screens 151a and 151b can be implemented as a single display that is divided into two parts. Reference to the first and the second that represent or refer to the touch screens are used for convenience of explanation and they do not limit the number and order of touch screens.

The first and second objects 11 and 12 may be contents visually displayed on the first and second touch screens 151a and 151b. While the first and second objects 11 and 12 are web pages displayed according to web surfing in the embodiments of the invention, the first and second objects 11 and 12 are not limited thereto. That is, the first and second objects 11 and 12 may be various documents and, particularly, texts that can be input by users. Additionally, the first and second objects 11 and 12 may be graphic user interfaces (GUIs), text, symbols, icons, characters, graphics, or a combination thereof. However, the embodiments are explained on the assumption that the first and second objects 11 and 12 are web pages for convenience of implementation.

When the first and second objects 11 and 12 are displayed, a touch input applied to one of input windows P1, P2, P3 and P4 of the second touch screen 151b may be received in operation S20. The input windows P1, P2, P3 and P4 may be regions to which the user can input characters. When one of the input windows P1, P2, P3 and P4 is selected, one of the first and second objects 11 and 12, which includes the selected input window, can be activated. Activation of an object means that the object can receive an input from the user. For example, if the user touches the first input window P1 of the second touch screen 151b, the second object 12 including the first input window P1 is activated. At the same time when the second object 12 is activated, the first input window P1 may be in a state that the first input window P1 waits for an additional input from the user. Accordingly, when the first input window P1 receives the additional input from the user, the input value can be displayed in the first input window P1.

Upon the completion of input to the first input window P1, the user can select the input window P2, P3 or P4 other than the first input window P1 to inactivate the first input window P1 and the second object 12 including the first input window P1. Other ways of inactivation the input window P2 is also possible, such as another selection (or touch) of the first input window P1 or a touch to a portion of the second touch screen 151b other than the input windows P1, P2, P3 or P4. When the second object 12 including the first input window P1 is inactivated, a key value may be not input to the first input window P1 any more even if the user inputs the key value. If the first and second objects 11 and 12 are word texts that can be input by the user, the first and second objects 11 and 12 themselves can be input windows.

When an input touch applied to an input window of the second touch screen 151b is received, a virtual keypad (Q shown in FIG. 9) may be displayed on the first touch screen 151a in operation S30 and characters may be input through the displayed virtual keypad (Q shown in FIG. 9) in step S40.

The virtual keypad (Q shown in FIG. 9) is a window through which a user inputs characters. As described above, the mobile terminal 100 according to one embodiment of the invention may not have additional physical keys. Accordingly, the user can apply desired touch inputs to the first and second touch screens 151a and 151b and the virtual keypad (Q shown in FIG. 9) can be displayed on the first and second touch screens 151a and 151b to allow the user to easily input characters.

The virtual keypad (Q shown in FIG. 9) may be displayed as QWERTY keyboard. QWERTY keyboard is a keyboard having virtual keys arranged in the form similar to the conventional keyboard. When the virtual keypad (Q shown in FIG. 9) is displayed as QWERTY keyboard, users accustomed to using the conventional keyboard can easily input characters. In embodiments of the invention, the virtual keypad may display alphabetical characters, or characters of other languages, such as Korean, as well as other symbols.

Furthermore, handwriting recognition may be used for the user to input characters. That is, the user can input characters to a handwriting input window using a finger or stylus. However, characters are input through the virtual keypad (Q shown in FIG. 9) displayed in the form of QWERTY keyboard in the drawings and embodiments of the invention.

The virtual keypad (Q shown in FIG. 9) may be displayed on one of the first and second touch screens 151a and 151b, which does not have an activated object. For example, if the user selects the first input window P1 included in the second object 12 displayed on the second touch screen 151b, the virtual keypad (Q shown in FIG. 9) can be displayed on the first touch screen 151a. The second object 12 including the first input window P1 displayed on the second touch screen 151b may be an object in which the user is currently interested. In this case, the virtual keypad (Q shown in FIG. 9) can be displayed on the first touch screen 151a in order to prevent the virtual keypad from covering the second object 12 in which the user is interested, and thus the user can use the mobile terminal 100 more conveniently. In embodiments of the invention, the second touch screen 151a need not be displaying the first object before the virtual keypad is to be displayed. That is, while the second touch screen 151b is displaying the second object 12, the first touch screen 151a may be blank.

Figure 8:
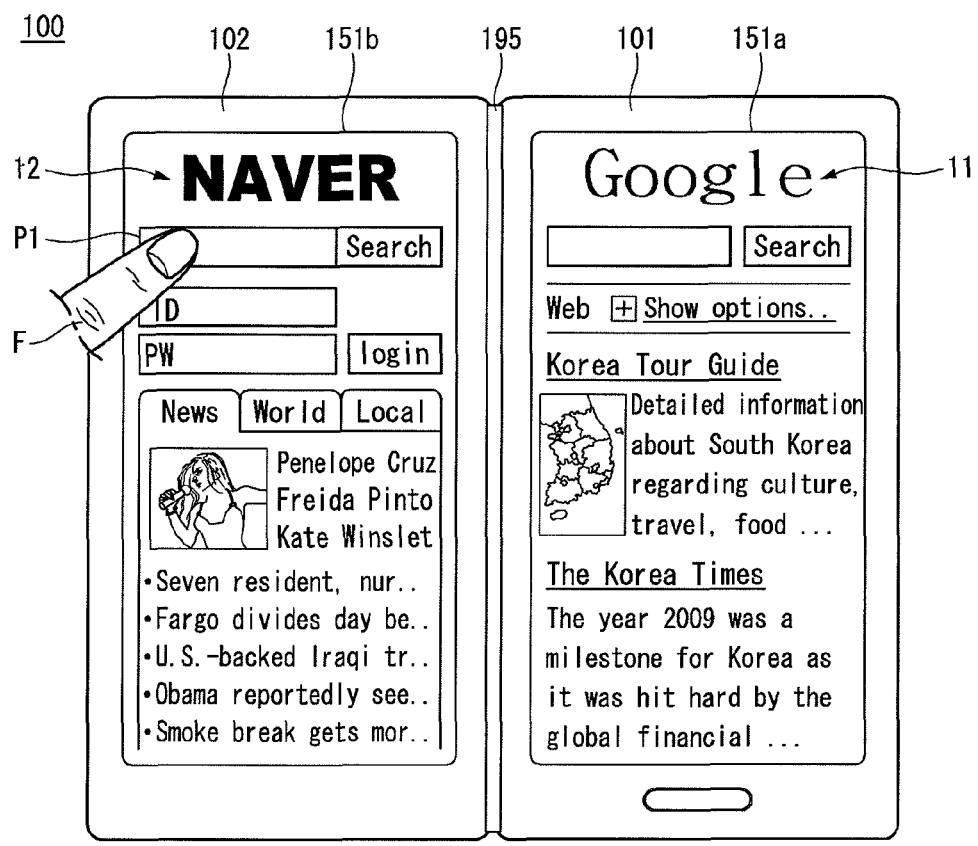
FIG. 8 illustrates an operation of touching one of the touch screens of the mobile terminal, shown in FIG. 7, to input an input value.
Figure 9:
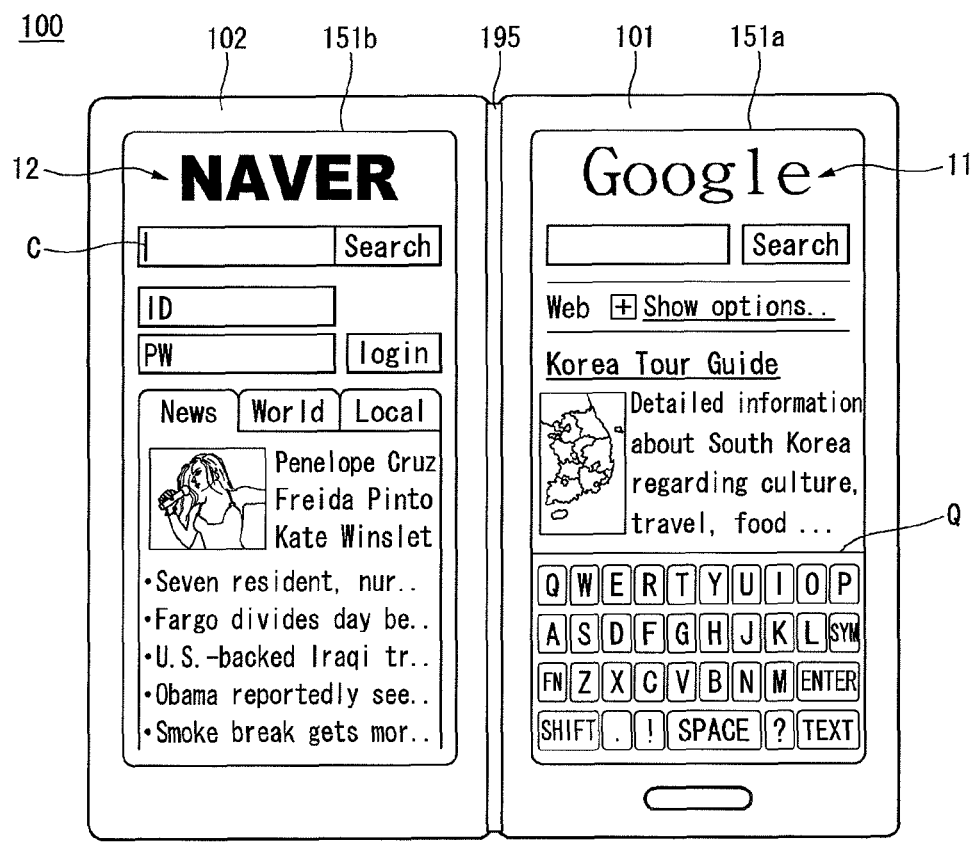
FIG. 9 illustrates a virtual keypad displayed on the other one of the touch screens of the mobile terminal shown in FIG. 7.

FIG. 8 illustrates an operation of applying a touch input to one of the touch screens shown in FIG. 7 and FIG. 9 illustrates QWERTY keyboard displayed on the other touch screen shown in FIG. 7.

As shown in FIG. 8, the user can touch the first input window P1 of the second object 12 displayed on the second touch screen 151b. The first input window P1 for receiving a search keyword input thereto is included in the second object 12.

As shown in FIG. 9, when the user touches the first input window P1, an input cursor C can be displayed in the first input window P1 to visually indicate a standby state for receiving a user's input. Simultaneously, the second object 12 including the first input window P1 can be activated.

The virtual keypad Q may be displayed on the first touch screen 151a displaying the first object 11 at the same time when the second object 12 including the first input window P1 is activated by the user. That is, the virtual keypad Q may be displayed such that the virtual keypad Q does not cover the second object 12 to which the user wants to apply an input.

Figure 10:
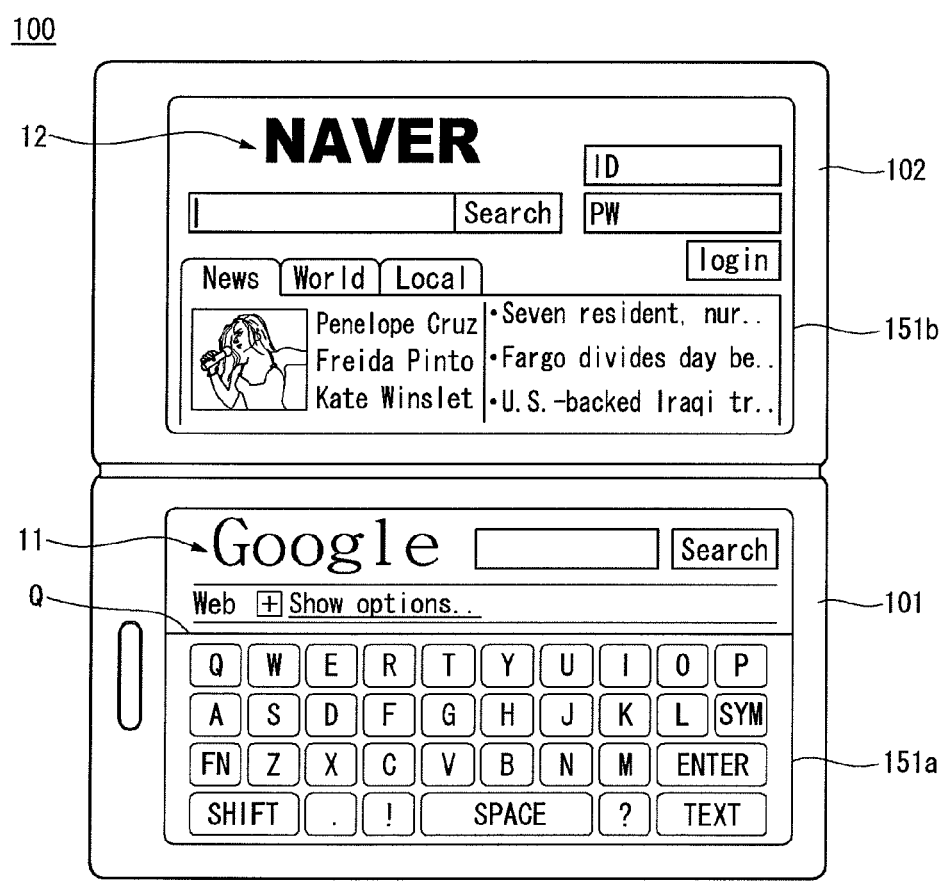
FIG. 10 illustrates the mobile terminal rotated from the vertical direction to the horizontal direction.

FIG. 10 illustrates the mobile terminal 100 shown in FIG. 9 when rotated.

Referring to FIG. 10, the user may rotate the mobile terminal 100 in the vertical direction to the horizontal direction. When the user rotates the mobile terminal 100, a gyro sensor included in the mobile terminal 100 can sense the rotation of the mobile terminal 100. When the position change of the mobile terminal 100 is sensed by the gyro sensor, the controller 180 can change the positions of the first and second objects 11 and 12 displayed on the first and second touch screens 151a and 151b such that the first and second objects 11 and 12 correspond to the position change of the mobile terminal 100.

Even if the direction in which the first and second objects 11 and 12 are displayed is changed, the virtual keypad Q can be displayed on the first touch screen 151a instead of the second touch screen 151b displaying the currently activated second object 12. Accordingly, the virtual keypad Q will not obstruct the view of the user irrespective of the direction in which the user holds the mobile terminal 100.

Figure 11:
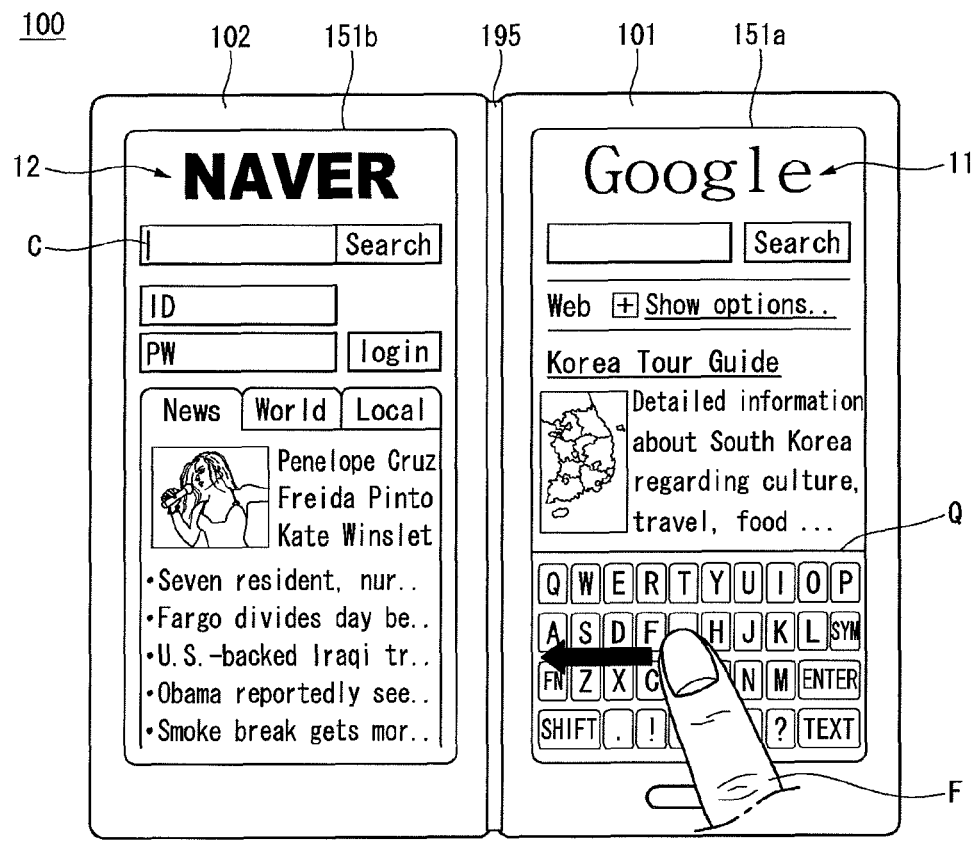
FIGS. 11 and 12 illustrate an operation of dragging the virtual keypad displayed on the mobile terminal, shown in FIG. 9, and inputting characters.
Figure 12:
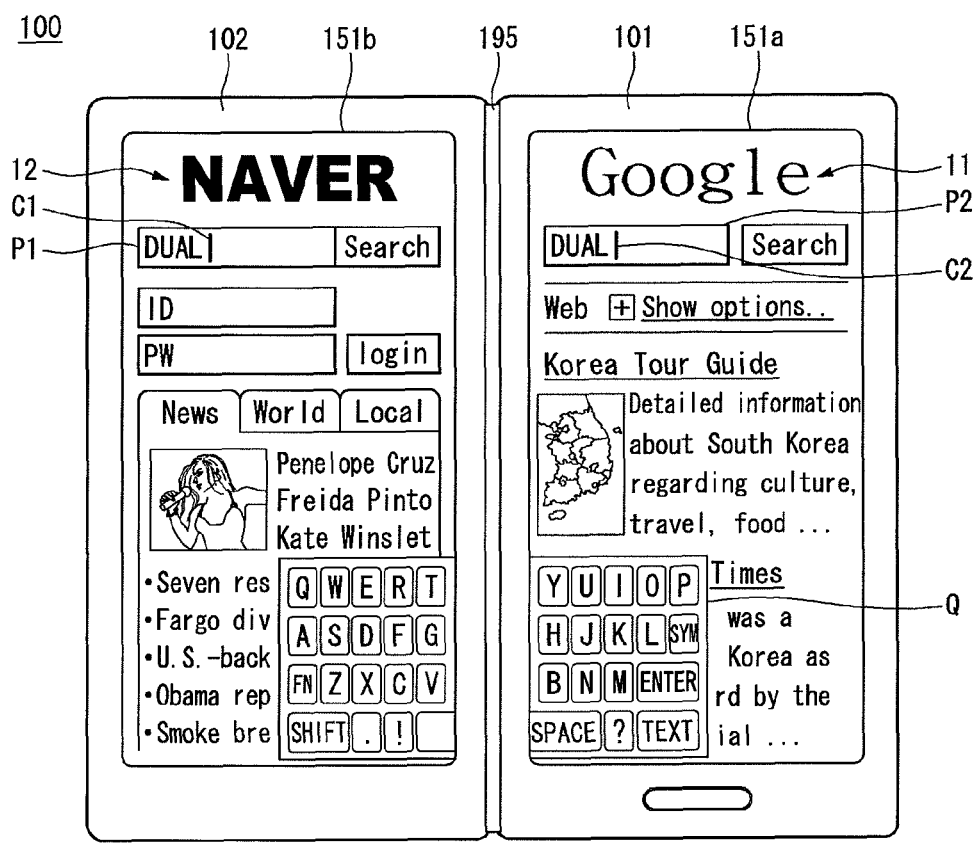

FIGS. 11 and 12 illustrate an operation of dragging the QWERTY keyboard displayed on the mobile terminal 100 shown in FIG. 9 and inputting characters through the keyboard.

Referring to FIG. 11, the user can touch and drag the virtual keypad Q displayed on the first touch screen 151a. While the user drags the virtual keypad Q to the direction of the second touch screen 151b in FIG. 11, the user can drag the virtual keypad Q to any direction that the user wants. For example, the user can touch the virtual keypad Q and drag the touch upward.

Referring to FIG. 12, if the user touches the virtual keypad Q and drags the touch in the horizontal direction, the virtual keypad Q can be displayed straddling over the first and second touch screens 151a and 151b. That is, different portions of the virtual keypad Q can be displayed over respective portions of the first and second touch screens 151a and 151b.

When the virtual keypad Q can be displayed over the first and second touch screens 151a and 151b, both the first and second objects 11 and 12 can be activated. More specifically, the user can touch the first input window P1 to activate the second object 12 of the second touch screen 151b and display the virtual keypad Q on the first touch screen 151a. In this state, if the user drags the virtual keypad Q to display the virtual keypad Q on both the first and second touch screens 151a and 151b, the first and second objects 11 and 12 displayed on the first and second touch screens 151a and 151b can be activated. When both the first and second objects 11 and 12 are activated, the first and second objects can receive an input from the user. The first and second input windows P1 and P2 included in the first and second objects 11 and 12 may respectively display first and second cursors C1 and C2 for indicating a standby state for user's input.

Since the first and second objects 11 and 12 can simultaneously receive an input from the user, the user can simultaneously input characters to the first and second objects 11 and 12 through the virtual keypad Q. For example, if the user inputs a word "DUAL" through the virtual keypad Q, the word can be input to the first and second input windows P1 and P2. Accordingly, the user can simultaneously search a plurality of web sites for the word when the mobile terminal 100 uses a web search function, as shown in FIG. 12.

Figure 13:
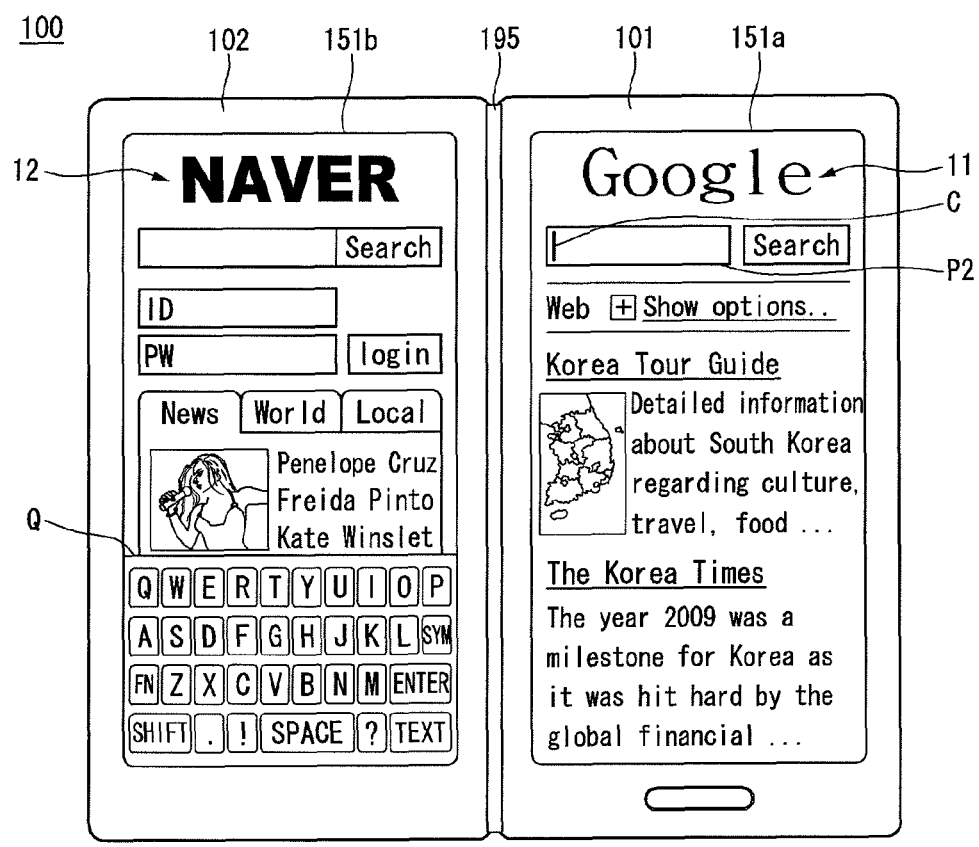
FIG. 13 illustrates an operation of moving the virtual keypad displayed on the mobile terminal, shown in FIG. 9, to the other touch screen.

FIG. 13 illustrates an operation of moving the virtual keypad displayed on one of the touch screens shown in FIG. 9 to the other touch screen.

Referring to FIG. 13, the user may drag the virtual keypad Q to display the virtual keypad Q only on the second touch screen 151b. When the user moves the virtual keypad Q to display the virtual keypad Q only on the second touch screen 151b, the second object 12 displayed on the second touch screen 151b is inactivated and the first object 11 displayed on the first touch screen 151a is activated. Accordingly, the cursor C that indicates the standby state for user's input can be displayed in the second input window P2 included in the first object 11. That is, the user can control activation of an object simply by moving the virtual keypad Q. In addition, the user can activate the first object 11 displayed on the first touch screen 151a in order to move the virtual keypad Q, displayed on the first touch screen 151a according to activation of the second object 12 displayed on the second touch screen 151b, to the second touch screen 151b.

Figure 14:
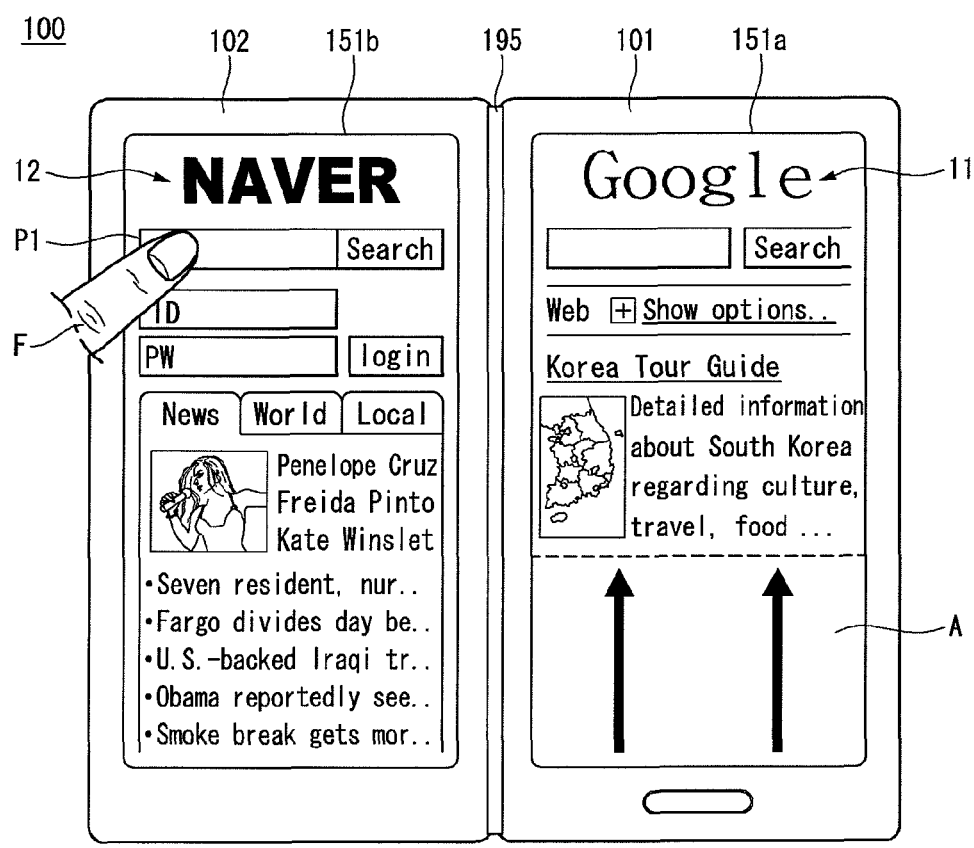
FIGS. 14 and 15 illustrate an operation of displaying the virtual keypad according to another embodiment.
Figure 15:
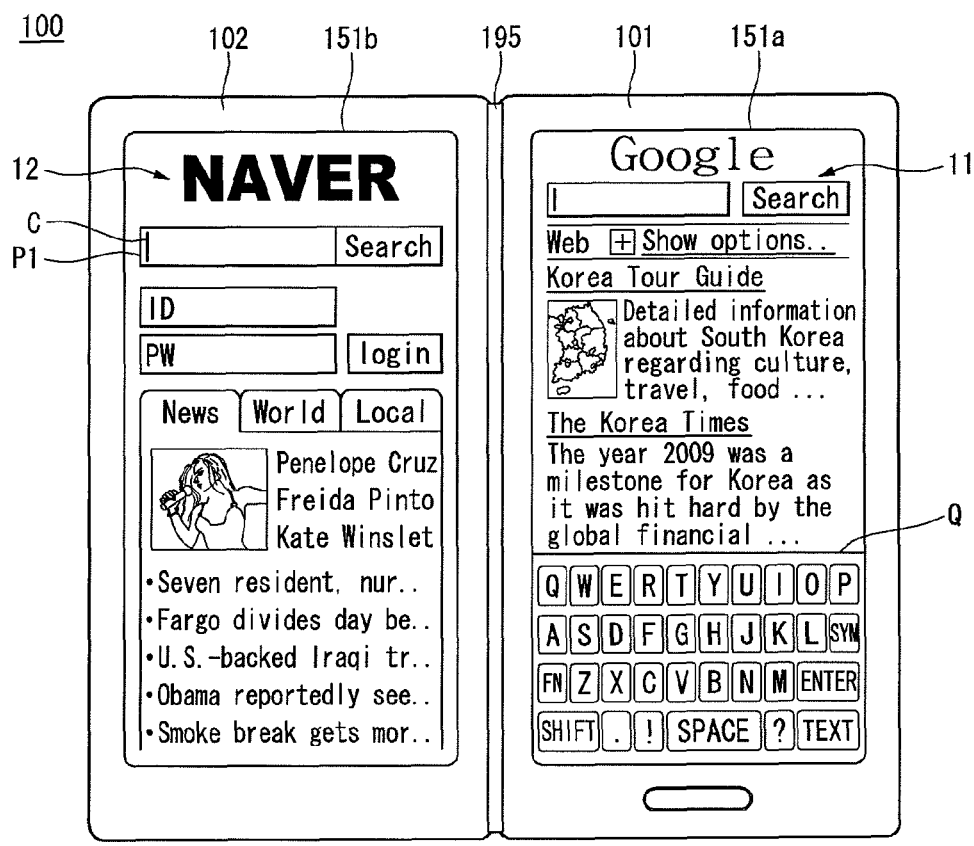

FIGS. 14 and 15 illustrate an operation of displaying the virtual keypad according to another embodiment of the invention.

As shown in FIGS. 14 and 15, the virtual keypad Q may be displayed on the mobile terminal 100 without covering the object displayed on the mobile terminal 100.

Referring to FIG. 14, the user may touch the first input window P1 of the second object 12 displayed on the second touch screen 151b with a finger F. When the first input window P1 through which the user can input characters is touched, the virtual keypad Q can be displayed on the first touch screen 151a, as described above.

The first object 11 may be displayed on the entire first touch screen 151a right before the virtual keypad Q is displayed on the first touch screen 151a. In the mobile terminal 100 according to another embodiment of the invention, the area in which the first object 11 is displayed may be reduced to secure a keypad region A for displaying the virtual keypad Q. That is, an operation of decreasing the vertical length of the first object 11 by the keypad region A may be performed before or as the virtual keypad Q is displayed.

Referring to FIG. 15, the cursor C for indicating the standby state for users' input may be displayed in the first input window P1 and the virtual keypad Q may be displayed on the first touch screen 151a. However, the first object 11 is not covered by the virtual keypad Q, and thus the virtual keypad Q does not obstruct the user's view of the first object 11.

FIGS. 16, 17, 18 and 19 illustrate an operation of inputting characters using latest results according to an embodiment of the invention.

As shown in FIGS. 16, 17, 18 and 19, the mobile terminal 100 according to one embodiment of the invention can input characters in various manners.

Figure 16:
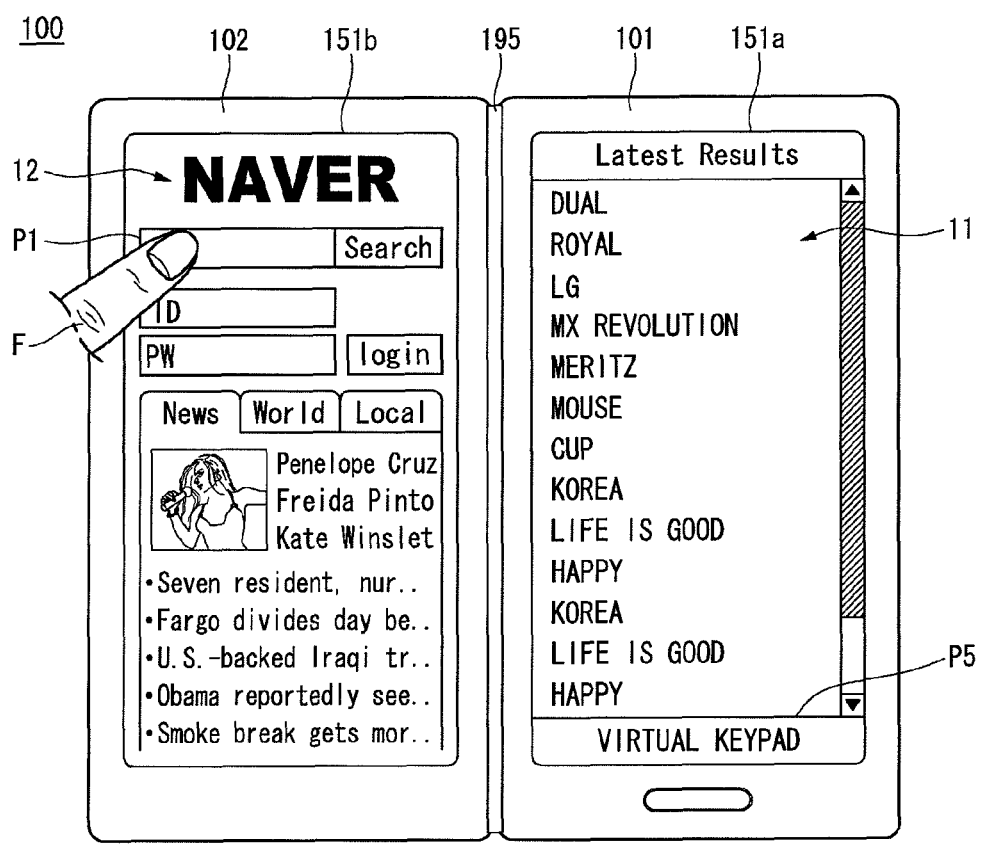
FIGS. 16, 17, 18 and 19 illustrate an operation of inputting characters using latest results.

Referring to FIG. 16, the user may touch the first input window P1 included in the second object 12 displayed on the second touch screen 151b. The user can show the intention of inputting characters to the first input window P1 by touching the first input window P1. Accordingly, the controller (180 shown in FIG. 1) can display latest results (or most popular search result, most frequently searched result, or previous search result) on the first touch screen 151a. Words that the user wants to input may be in a specific range. Accordingly, when the latest results are displayed and the user selects one of them, the selected result is automatically input as an input value, and thus the user can use the mobile terminal 100 conveniently.

A keypad display button P5 by which the user can display the virtual keypad Q may be displayed on the first touch screen 151a with the latest results. That is, when the latest results do not include a word or text that the user wants to input, the virtual keypad Q can be selectively displayed to allow a user to input the word or text through the virtual keypad Q.

Figure 17:
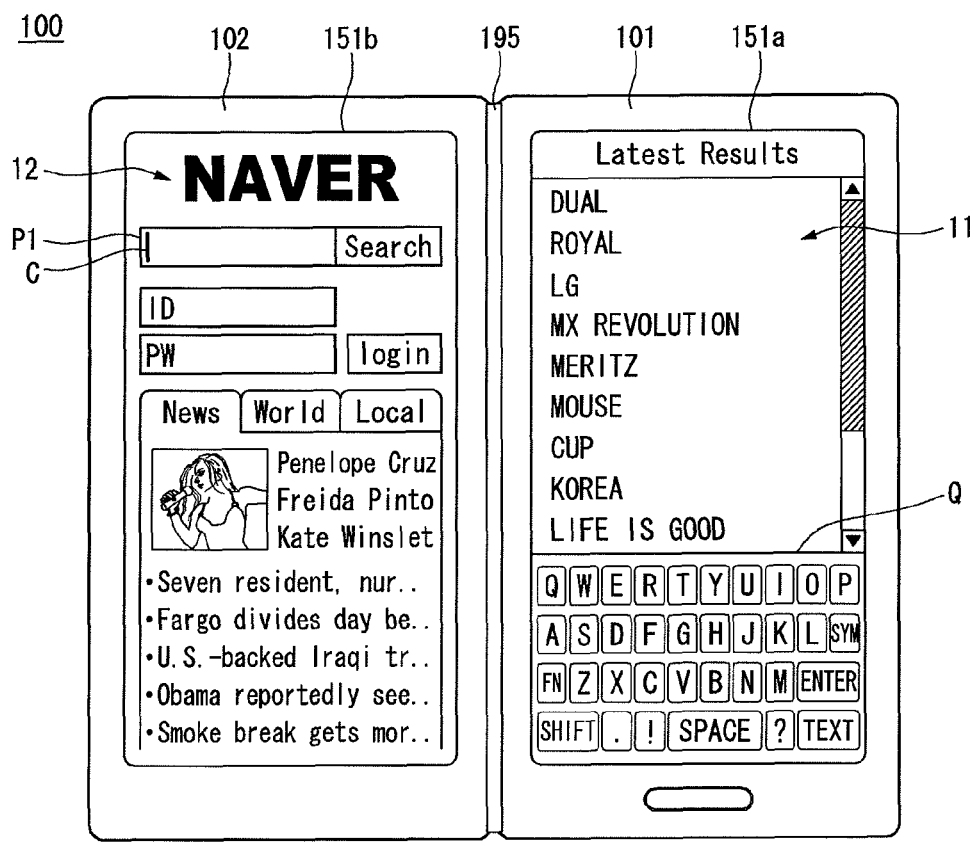

Referring to FIG. 17, the virtual keypad Q may be displayed with the latest result. The virtual keypad Q can be displayed by touching the keypad display button P5, as described above. Further, the virtual keypad Q may be displayed with the latest results from the beginning without having an additional user input.

Figure 18:
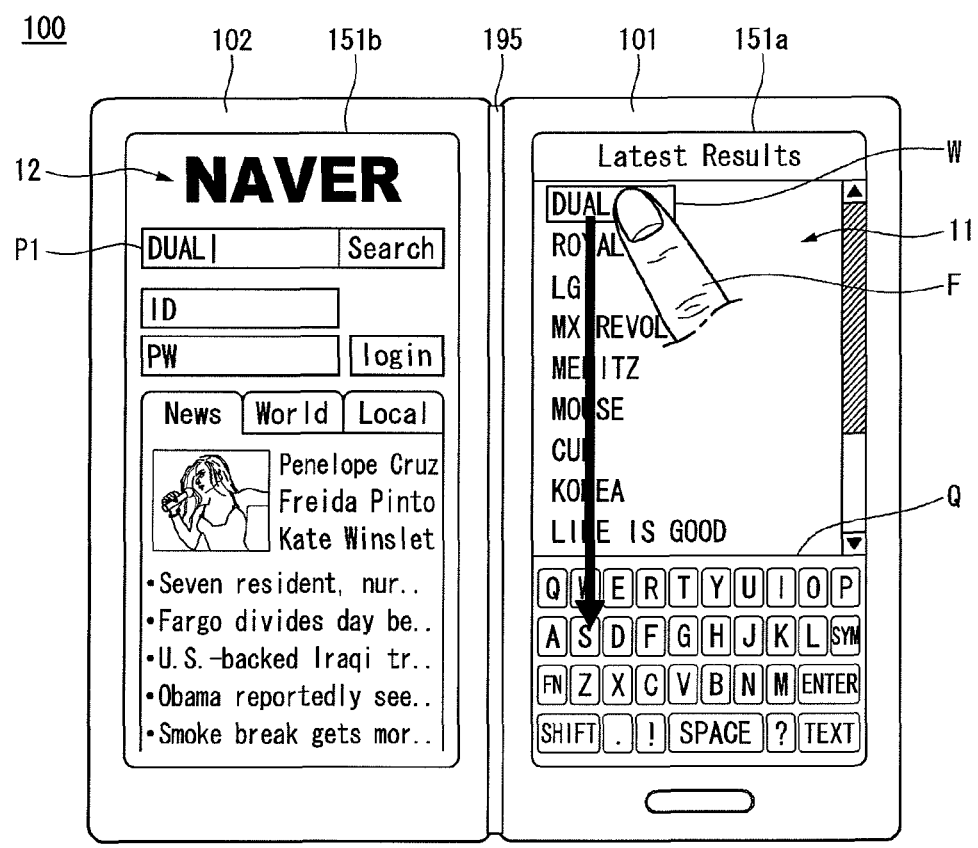

Referring to FIG. 18, the user may touch and drag a first word W among the latest results and then drop the first word W to the virtual keypad Q. When the user drops the first word W to the virtual keypad Q, the controller (180 shown in FIG. 1) can display the dropped first word W in the first input window P1. That is, a word can be input to the first input window P1 even though the user does not directly input the word using the virtual keypad Q.

Figure 19:
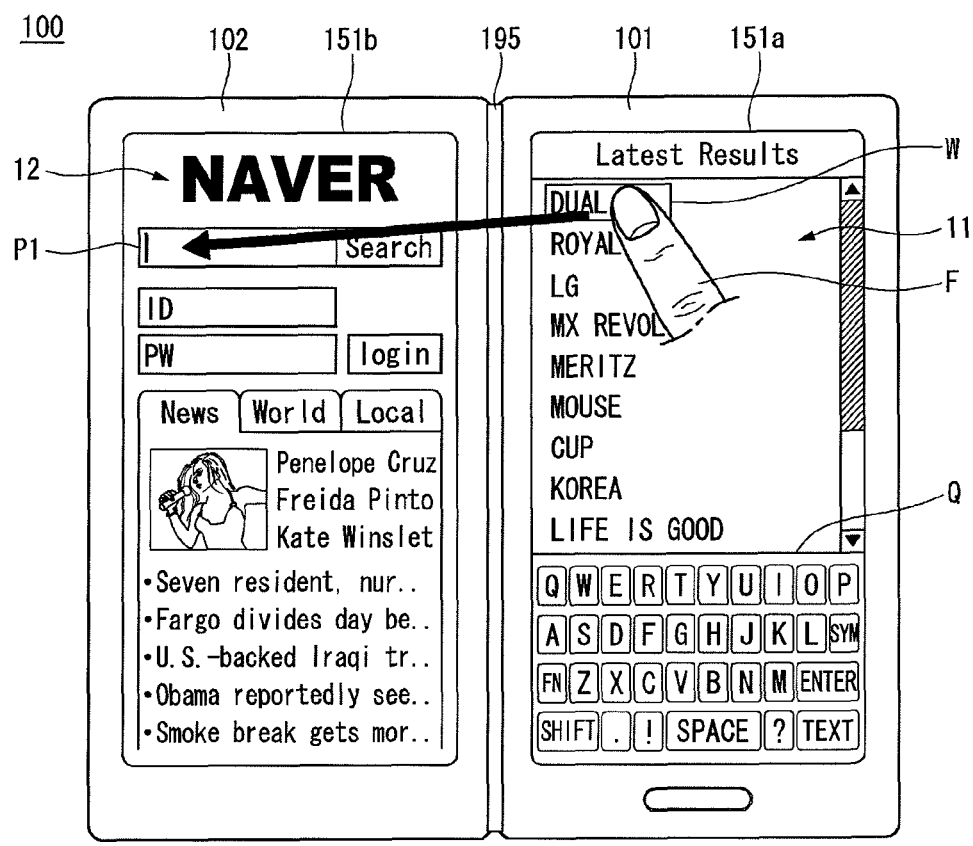

Referring to FIG. 19, the user may touch and drag the first word W among the latest results with a finger F and drop the first word W to the first input window P1. When the user drops the first word W to the first input window P1, the dropped first word W can be displayed in the first input window P1.

Figure 20:
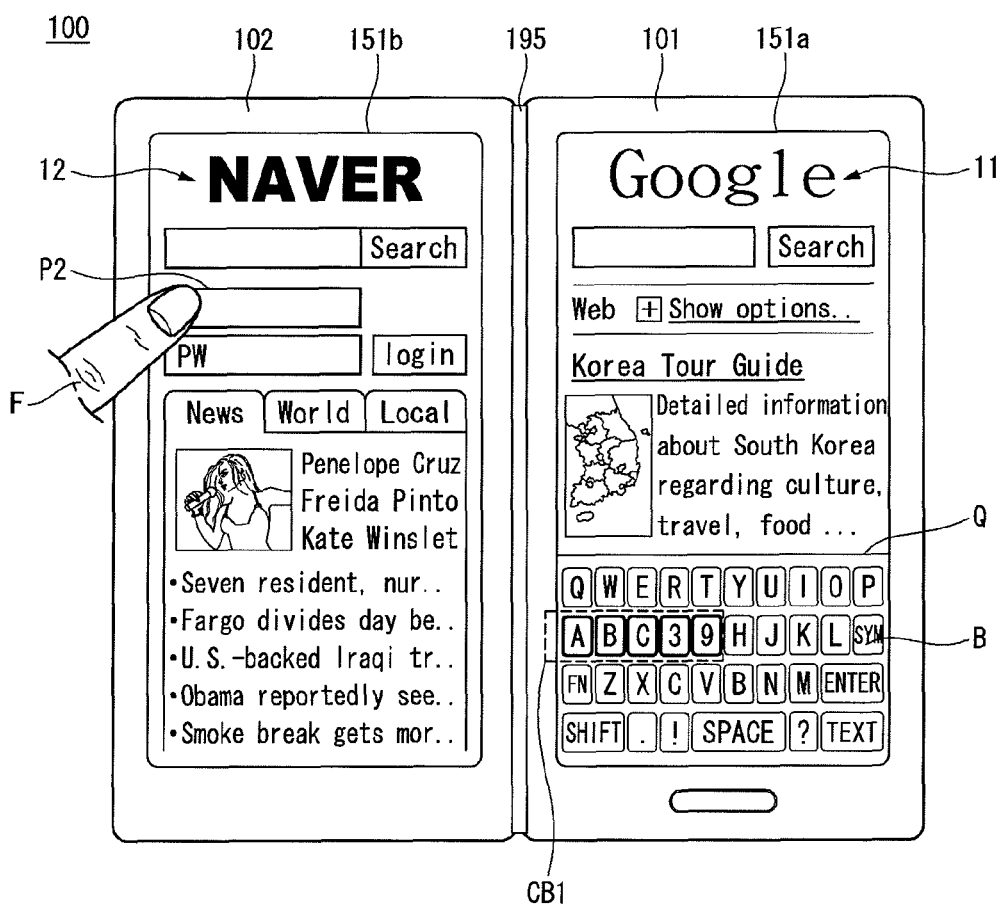
FIGS. 20 and 21 illustrate an operation of inputting characters according to another embodiment.
Figure 21:
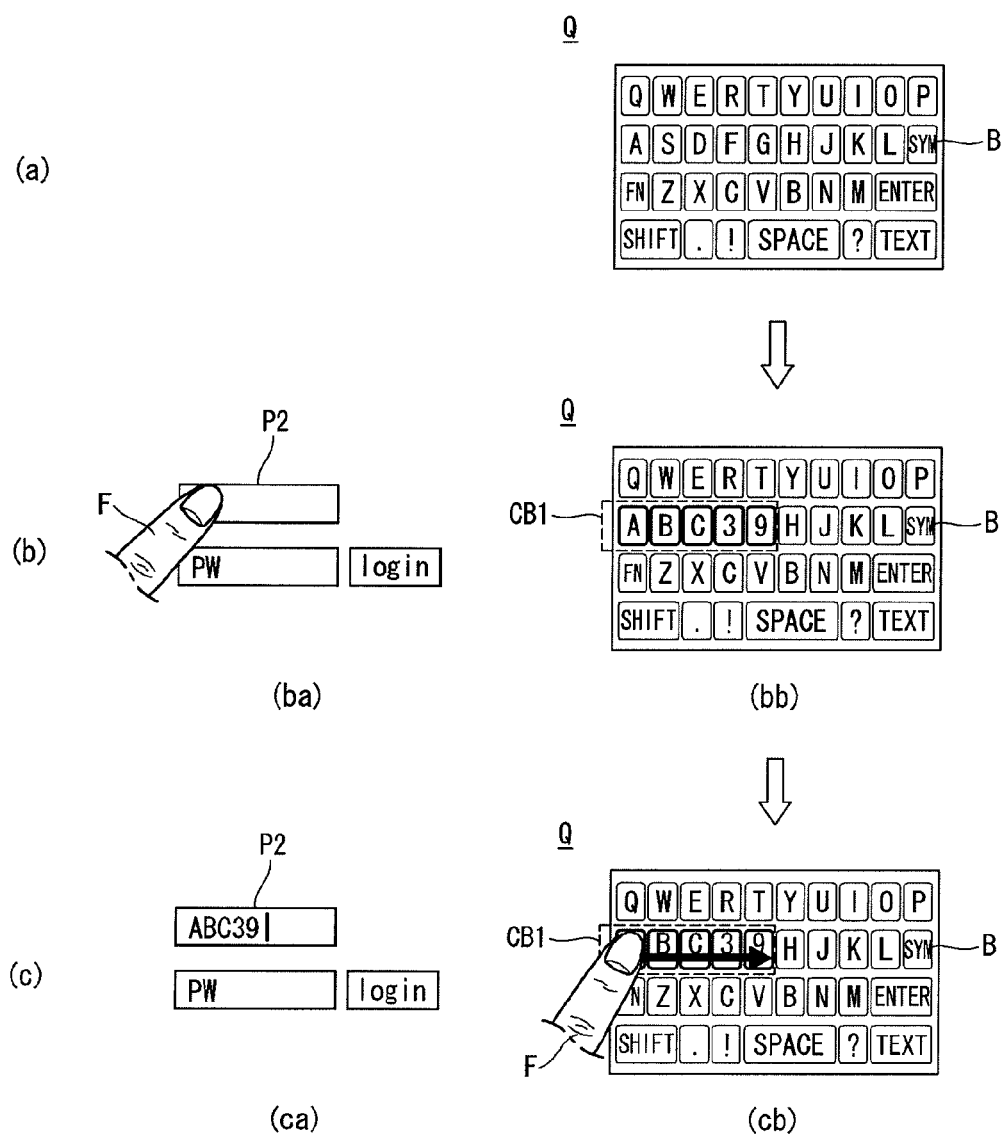

FIGS. 20 and 21 illustrate an operation of inputting characters according to another embodiment of the invention.

As shown in FIGS. 20 and 21, the mobile terminal 100 according to another embodiment of the invention can input an ID to a specific web site through the second input window P2.

Referring to FIG. 20, when the user touches the second input window P2 for inputting the ID of the web site corresponding to the second object 12 displayed on the second touch screen 151b, key buttons B of the virtual keypad Q may be rearranged. That is, the key buttons B of the virtual keypad Q can be rearranged such that the ID of the web site, stored in the memory (160 shown in FIG. 1), can be easily input. For example, if the user ID of the web site corresponding to the second object 12 is ABC39, the key buttons of the virtual keypad Q can be rearranged in such a manner that A, B, C, 3 and 9 are sequentially arranged in a row. This will be explained in detail with reference to FIG. 21.

FIG. 21 (a) shows that the key buttons B of the virtual keypad Q are arranged in the form of conventional QWERTY keyboard.

Referring to FIG. 21 (b), when the user selects the second input window P2 for inputting the ID (ba), some of the key buttons B of the virtual keypad Q are arranged as first buttons CB1 corresponding to the user ID, ABC39, (bb).

Referring to FIG. 21(c), when the user drags the first buttons CB1 from the left to the right (cb), the user ID is input to the second input window P2.

The arrangement of the key buttons B of the virtual keypad Q is automatically changed according to the user ID of a specific web site or a document that requires input of user ID, and thus the user can easily input the user ID even when the user does not memorize the user ID.

Figure 22:
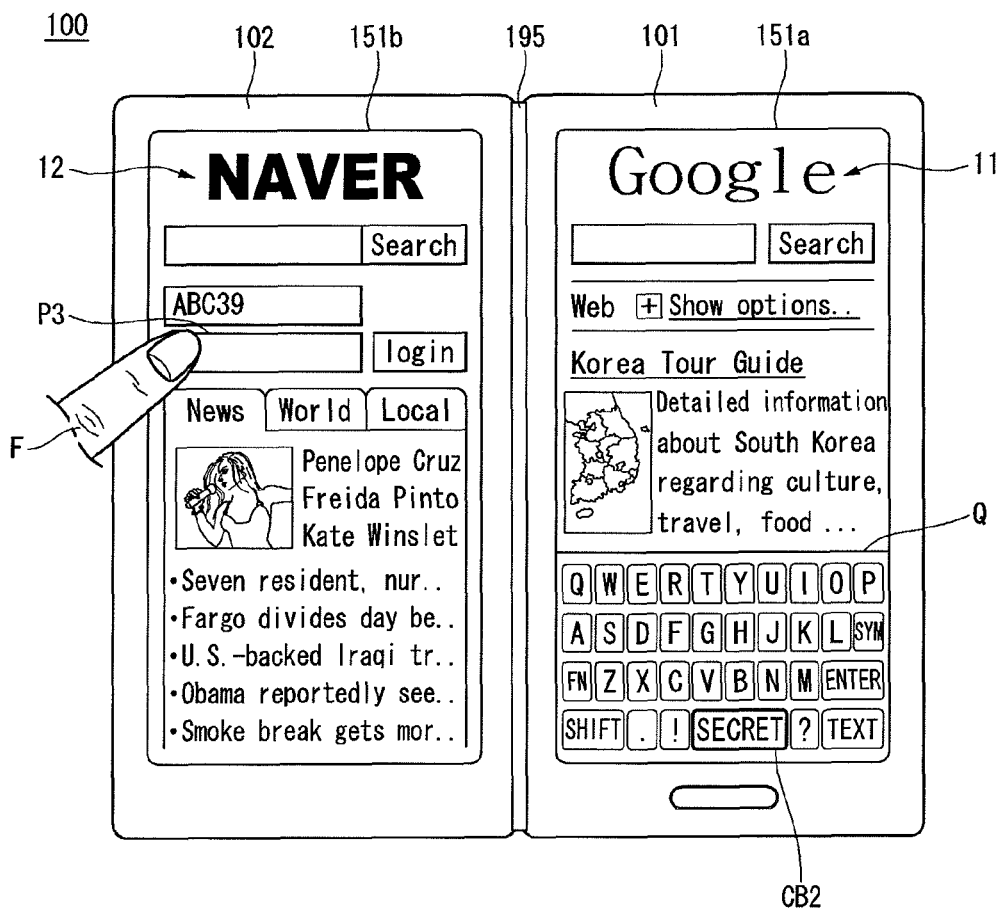
FIGS. 22 and 23 illustrate an operation of inputting characters according to another embodiment.
Figure 23:
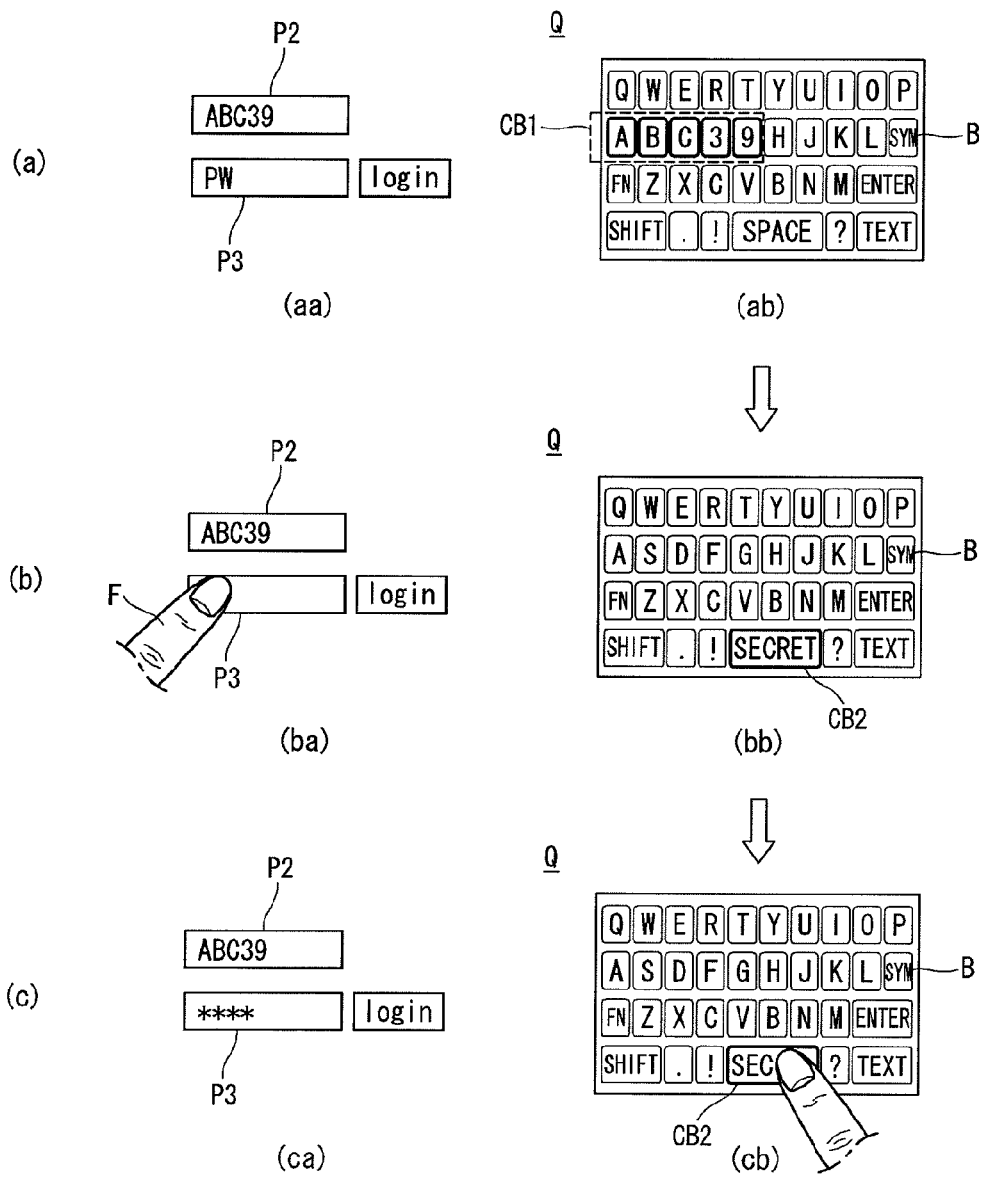

FIGS. 22 and 23 illustrate an operation of inputting characters according to another embodiment of the invention.

As shown in FIGS. 22 and 23, the mobile terminal 100 according to another embodiment of the invention can input the password of a specific web site through the third input window P3.

Referring to FIG. 22, when the user touches the third input window P3 for inputting a password, a password button CB2 may be displayed on the virtual keypad Q. The password button CB2 may be designated as "secret" as in FIG. 22, or may be other word, text, character, symbol, icon, graphic, etc.

Referring to FIG. 23 (a), the user ID is input to the second input window P2 using the first buttons CB1.

Referring to FIG. 23 (b), when the user selects the third input window P3 for inputting the password, the password button CB2 may be displayed on the virtual keypad Q.

Referring to FIG. 23 (c), when the user selects the password button CB2, the password is automatically input to the third input window P3.

The password button CB2 is automatically displayed on the virtual keypad Q according to a user password of a specific web site or a document that requires input of the password, and thus the user can easily input the password even when the user does not memorize the password.

The first and second objects displayed on the first and second touch screens are web sites in the aforementioned embodiments, the first and second objects are not limited thereto. For instance, the first and second objects may be various applications for creating texts.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a first touch screen configured to display plural first objects, wherein one of the plural first objects is an input window to receive characters;
   a second touch screen configured to display a second object; and
   a controller configured to display a virtual keypad on at least one of the first and second touch screens, a first input window on the first touch screen and a second input window on the second touch screen and change an activated input window receiving a user input via the virtual keypad between the first and second input windows based on a current position of the virtual keypad.

2. The mobile terminal of claim 1, wherein the controller controls display of the virtual keypad over at least a portion of the second object.

3. The mobile terminal of claim 1, wherein the first object includes at least one input window, and the touch input applied to the first touch screen is a touch applied to the at least one input window which waits for an input from a user.

4. The mobile terminal of claim 3, wherein the at least one input window is one that waits for an input corresponding to an ID of the user or a password corresponding to the ID, and the controller rearranges and displays a plurality of key buttons of the virtual keypad in a corresponding order of characters of the ID or the password.

5. The mobile terminal of claim 4, wherein, when the at least one input window is one that waits for the input corresponding to the ID of the user, the first object further includes another window that waits for an input of the password corresponding to the ID, and the controller controls appearance of a key button of the virtual keypad that enables input of the password into the another window.

6. The mobile terminal of claim 1, wherein the controller controls display of a first portion of the virtual keypad over a portion of the first object on the first touch screen and a second portion of the virtual keypad over a portion of the second object on the second touch screen.

7. The mobile terminal of claim 6, wherein the controller transmits an input value input through the virtual keypad to both the first and second objects when the first and second portions of the virtual keypad are displayed over respective portions of the first and second touch screens.

8. The mobile terminal of claim 6, wherein the first and second portions of the virtual keypad are displayed over the respective portions of the first and second touch screens by a touch-and-drag of the displayed virtual keypad from the second touch screen to the portion of the first touch screen.

9. The mobile terminal of claim 1, wherein the controller displays a cursor for indicating a standby state of waiting for an input from the user in the input window to which a touch input is applied.

10. The mobile terminal of claim 1, wherein the controller reduces an area in which the second object is displayed on the second touch screen by a region in which the virtual keypad is to be displayed and displays the virtual keypad in the region.

11. The mobile terminal of claim 1, wherein the first object includes a first window, the controller control display of words or texts that were input previously by the user on the first touch screen, and, when the user drags and drops one of the words or texts on the virtual keypad, the controller controls display of the dragged and dropped word or text in the first window.

12. The mobile terminal of claim 1, wherein the first object includes a first window, the controller control display of words or texts that were input previously by the user on the first touch screen, and, when the user drag and drops one of the words or texts on the first window, the controller controls display of the dragged and dropped word in the first window.

13. The mobile terminal of claim 1, wherein the virtual keypad is a QWERTY keyboard or a handwriting recognition input board.

14. The mobile terminal of claim 1, wherein the first and second touch screens are physically separated from each other.

15. The mobile terminal of claim 1, wherein the controller is configured to activate one of the first and second touch screens according to a displayed location of the virtual keypad.

16. The mobile terminal of claim 1, wherein the controller is configured to transmit an input value to the input window when at least one word is dropped on the virtual keypad.

17. The mobile terminal of claim 1, wherein the controller is configured to re-arrange at least one key button of the virtual keypad according to a word being inputted to the input window.

18. The mobile terminal of claim 17, wherein the controller is configured to transmit the word to the input window when a touch is inputted to the re-arranged at least one key button.

19. The mobile terminal of claim 1, wherein the controller is configured to activate the first input window when the virtual keypad is positioned on the second touch screen and change the activated input window from the first input window to the second input window when the virtual keypad is moved to the first touch screen.

20. The mobile terminal of claim 19, wherein the controller is configured to activate the first and second input window simultaneously when at least one part of the virtual keypad is positioned on the first touch screen and at least another part of the virtual keypad is positioned on the second touch screen.

21. A displaying method of a mobile terminal, the method comprising:
   displaying plural first objects comprising an input window on a first touch screen and plural second objects on a second touch screen;
   displaying a virtual keypad on at least one of the first and second touch screens;
   displaying a first input window on the first touch screen and a second input window on the second touch screen; and
   changing an activated input window receiving a user input via the virtual keypad between the first and second input windows based on a current position of the virtual keypad.

22. The displaying method of claim 21, wherein the displaying of the virtual keypad includes reducing an area in which an object is displayed on the other of the first and second touch screens by a region in which the virtual keypad is to be displayed, and displaying the virtual keypad in the region.

23. The displaying method of claim 21, further comprising transmitting an input value that is input through the displayed virtual keypad to an object displayed on the one of first and second touch screens receiving the touch input, and displaying the input value on the object.

24. The displaying method of claim 21, further comprising:
   moving the displayed virtual keypad such that respective portions of the virtual keypad is displayed on both the first and second touch screens; and
   transmitting an input value input through the virtual keypad to first and second objects respectively displayed on the first and second touch screens for simultaneous display of the input value on the first and second objects.

* * * * *